United States Patent
Kwon

(10) Patent No.: US 7,157,173 B2
(45) Date of Patent: *Jan. 2, 2007

(54) FUSED ZIRCONIA-BASED SOLID OXIDE FUEL CELL

(75) Inventor: Oh-Hun Kwon, Westborough, MA (US)

(73) Assignee: Saint-Gobain Ceramics & Plastics, Inc., Woroester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/242,570

(22) Filed: Oct. 3, 2005

(65) Prior Publication Data

US 2006/0024565 A1    Feb. 2, 2006

Related U.S. Application Data

(63) Continuation of application No. 10/864,286, filed on Jun. 9, 2004, now Pat. No. 6,982,130.

(60) Provisional application No. 60/477,147, filed on Jun. 9, 2003.

(51) Int. Cl.
    *H01M 8/10* (2006.01)
(52) U.S. Cl. .................. 429/33; 429/30; 429/12; 429/16; 429/46

(58) Field of Classification Search .................. 429/33, 429/30, 12, 16, 46
    See application file for complete search history.

(56) References Cited

U.S. PATENT DOCUMENTS

| | | | |
|---|---|---|---|
| 4,857,420 A | 8/1989 | Maricle et al. | |
| 5,177,040 A | 1/1993 | Tamamaki et al. | |
| 5,908,713 A | 6/1999 | Ruka et al. | |
| 6,083,636 A | 7/2000 | Hsu | |
| 6,319,626 B1 | 11/2001 | Wallin et al. | |
| 6,982,130 B1 * | 1/2006 | Kwon | ............ 429/33 |
| 2003/0063994 A1 | 4/2003 | Uehara et al. | |
| 2003/0232249 A1 | 12/2003 | Lindereth et al. | |

* cited by examiner

*Primary Examiner*—Laura Weiner
(74) *Attorney, Agent, or Firm*—Larson Newman Abel Polansky & White, LLP; Robert T. Conway

(57) ABSTRACT

The disclosure is directed to a solid oxide fuel cell including an electrolyte. The electrolyte is formed using a fused electrolyte powder. The disclosure is also directed to a solid oxide fuel cell stack including a plurality of solid oxide fuel cells. Each solid oxide fuel cell of the plurality of solid oxide fuel cells includes an electrolyte. The electrolyte is formed using a fused electrolyte powder.

15 Claims, 3 Drawing Sheets

FUSED ZIRCONIA-BASED SOLID OXIDE FUEL CELL

CROSS-REFERENCE TO RELATED APPLICATION(S)

The present application is a continuation application of U.S. patent application Ser. No. 10/864,286, Jun. 9, 2004, entitled "FUSED ZIRCONIA-BASED SOLID OXIDE FUEL CELL," naming inventor Oh-Hun Kwon, which claims priority from U.S. provisional patent application No. 60/477,147, filed Jun. 9, 2003, entitled "FUSED ZIRCONIA-BASED SOLID OXIDE FUEL CELL," naming inventor Oh-Hun Kwon, which applications are both incorporated by reference herein in their entirety.

FIELD OF THE DISCLOSURE

The present invention generally relates to novel solid oxide fuel cells (SOFCs).

BACKGROUND

In pursuit of high-efficiency, environmentally friendly energy production, solid oxide fuel cell (SOFC) technologies have emerged as a potential alternative to conventional turbine and combustion engines. Fuel cell technologies typically have a higher efficiency and have lower CO and NOx emissions than traditional combustion engines. In addition, fuel cell technologies tend to be quiet and vibration-fee. Solid oxide fuel cells (SOFCs) have an advantage over other fuel cell varieties. For example, SOFCs may use fuel sources such as natural gas, propane, methanol, kerosene, and diesel, among others because SOFCs operate at high enough operating temperatures to allow for internal fuel reformation. However, challenges exist in reducing the cost of SOFC systems to be competitive with combustion engines and other fuel cell technologies. These challenges include lowering the cost of materials, improving degradation or life cycle, and improving operation characteristics such as current and power density.

A typical SOFC has an electrolyte made from an expensive, high-purity, chemically co-precipitated stabilized zirconia. Chemically co-precipitated stabilized zirconia may also be used in a porous support tube structure or doped with nickel to produce a fuel electrode (anode). Other expensive materials such as doped lanthanum manganite have been proposed as an air electrode (cathode). The cathode can also be made of a composite of doped lanthanum manganite and stabilized zirconia.

In addition to the cost of materials, conductivity degradation in the electrolyte should be considered. Typically, chemically co-precipitated stabilized zirconia-based electrolytes degrade at a rate as high as 0.5 percent per thousand hours of operation. This degradation has been attributed to gradual changes in the crystalline structure of the solid electrolyte and/or reaction with impurities. Degradation may also occur through on-and-off cycling. On-and-off cycling cycles temperatures, creating temperature differences between components during cooling and reheating. Even small differences in expansion coefficients among various components of an SOFC lead to cracks, flaws, and separations during cycling. These cracks, flaws and separations degrade conductivity and increase resistivity between components. Lost conductivity, increases in resistivity, and degradation of contact surface also lead to a reduction in operating voltages and current densities. As a solid electrolyte degrades, its resistance increases, detracting from the potential of the fuel cell. In addition, increases in resistance in the electrolytes, electrodes or interconnects reduce the power output. As a result of degradation, the expensive fuel cell components are replaced more frequently, leading to higher overall energy costs.

As such, many typical fuel cell systems suffer from deficiencies in providing a low cost alternative to other energy sources. In view of the foregoing, it is considered generally desirable to provide an improved SOFC having electrode and electrolyte materials having suitable properties for use in demanding SOFC applications.

SUMMARY

In one particular embodiment, the disclosure is directed to a solid oxide fuel cell comprising fused electrolyte material.

In another embodiment, the disclosure is directed to a solid oxide fuel cell stack comprising a plurality of solid oxide fuel cells. Each solid oxide fuel cell of the plurality of solid oxide fuel cells includes a fused electrolyte material.

In a further embodiment, the disclosure is directed to a solid oxide fuel cell comprising a layer comprised of fused material.

In another embodiment a solid oxide fuel cell system comprising a fuel system for conditioning fuel, an air system for conditioning air, a solid oxide fuel cell stack connected to the fuel system and connected to the air system, and a power conditioner electrically coupled to the solid oxide fuel cell stack. The solid oxide fuel cell stack has a plurality of solid oxide fuel cells. Each solid oxide fuel cell of the plurality of solid oxide fuel cells includes an electrolyte comprising fused electrolyte material.

In a further embodiment, the disclosure is directed to an electrolyte formed using fused electrolyte material.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

In one particular embodiment, the disclosure is directed to a solid oxide fuel cell (SOFC) including a layer formed of fused material. For example, the SOFC may include an electrolyte formed of fused, doped zirconia powder, such as fused, stabilized zirconia. In another exemplary embodiment, the SOFC may further include a conductivity agent, such as nickel, iron, cobalt, and other transition metals. A solid oxide fuel cell stack may be formed of a plurality of SOFCs.

Figure 1:
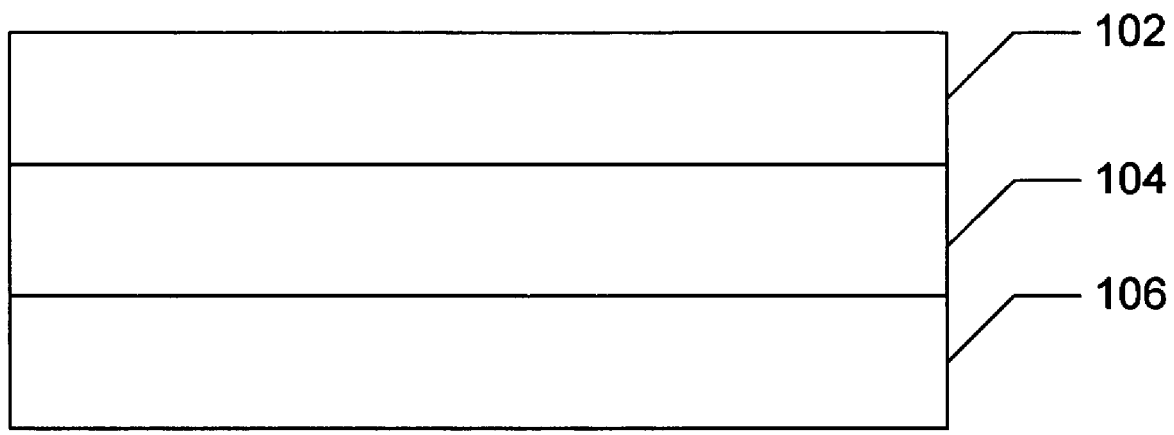
FIG. 1 is an illustration of an SOFC.

FIG. 1 depicts an exemplary SOFC. The SOFC has two electrodes 102 and 106, and an electrolyte 104. The anode 102 overlies the electrolyte 104. The electrolyte 104 overlies the cathode 106. In operation, oxygen ions are transported across the electrolyte 104 to react with incoming fuel. This ion transport produces an electrical potential between the anode 102 and the cathode 106. In more detail, oxygen-containing gas enters through a cathode and diffuses to a cathode/electrolyte interface. Fuel diffuses through an anode to an anode/electrolyte interface. Oxygen ions are transported across the electrolyte from the cathode interface to the anode interface, where the oxygen ions react with the fuel. Multiple SOFCs as shown in FIG. 1 may be stacked on top of each other to form a solid oxide fuel cell stack.

According to another embodiment, the electrode of the solid oxide fuel cell is formed of a fused material, such as a fused powder. Alternatively or additionally, a fused powder may be used to form an interconnect.

Fused material may take various forms including a wide range of oxide and non-oxide materials. Oxide materials, in particular, include doped and undoped zirconia, ceria, and gallia. The zirconia and ceria materials may be stabilized with various oxides including oxides of yttrium, scandium, samarium, ytterbium and gadolinium. In one specific embodiment, a fused electrolyte powder may be yttria-stabilized zirconia with at least about 8 mole percent yttria and may be formed through an arc melting or fusion process. For example, the yttria-stabilized zirconia may include at least about 8.5 mole percent yttria, at least about 9 mole percent yttria, at least about 9.5 mole percent yttria, or at least about 10 mole percent yttria. In another embodiment, the fused electrolyte powder may be 10 mole percent yttria-stabilized zirconia formed through an arc melting or fusion process.

The fused electrode material may take similar forms to that of the fused electrolyte material. For example, a component of electrode material may be a stabilized zirconia, stabilized with approximately 8 to 10 mole percent yttria, and be formed using an arc melting or fusion process. The fused electrode material may contain conductivity agents, such as metals and metal oxides, such as nickel. In this case, nickel oxide may be mixed with fused powder, which is processed to for sintered, fused electrodes, the nickel oxide being reduced to nickel in a reducing atmosphere. Reduction of the nickel oxide may not only provide desirable conductivity in the resulting electrode, but also desirable porosity for fuel and/or oxygen migration to the electrolyte surface.

Fused powder tends to have a greater amount of impurities than more expensive chemical precipitation powder. In general, the impurities of fused powders may be less than about 2% or less than about 1% by weight. However, in some embodiments, the impurities may be greater than about 0.2%, 0.5%, 0.7%, or 1% and as high as 2% or higher, but generally less than 5% by weight. The impurities may include inert components, such as alumina, that have limited influence on the properties of the electrolyte, electrode, or interconnect. The percentages of impurities will vary depending on the inclusion of inert components.

An exemplary electrolyte may be formed using a tape-casting method with an organic binder. The electrolyte may then be densified by sintering, which includes pressureless sintering, hot pressing, hot isostatically pressing, hot uniaxially pressing, or hot forging. The electrolyte may be co-formed with the balance of an SOFC or SOFC stack, such as by co-sintering, and preferably co-hot pressing so as to form a cell or stack in one densification step. The resulting electrolyte is durable with a reasonable ionic conductivity at least about 0.05 S/cm, such as at least about 0.10 S/cm or at least about 0.12 S/cm. In one exemplary embodiment, the electrical conductivity is not greater than about 0.5 S/cm, such as not greater than about 0.3 S/cm or not greater than about 0.2 S/cm. For example, the ionic conductivity may be between about 0.12 S/cm and about 0.2 S/cm. Moreover, the electrolyte conductivity degrades at not more than about 2.5%, such as not more than about 2.0%, not more than about 0.5%, not more than about 0.2%, or not more than about 0.1% per 1,000 hours.

The electrolyte may be used in a solid oxide fuel cell having an anode and a cathode, as already described above. The solid oxide fuel cell including the electrolyte may be included in a stack of solid oxide fuel cells, and may include 3 or more cells, such as at least 4 cells, but may include 10, 50 or greater than 100 fuel cells, among various configurations.

EXAMPLE 1

A batch of arc-melted and air-quenched crude including 10 mole percent yttria stabilized zirconia (Sample 1) was milled to an average particle size of approximately 0.6 micrometers by an attrition mill using yttria-stabilized tetragonal zirconia polycrystals (Y-TZP) milling media, followed by a spray drying.

The spray-dried powder was mixed with an organic binder in solvent and tape cast to form thin tapes of approximately 0.4 millimeters thick. Some spray-dried powder was cold isostatically pressed into rectangular tiles at 207 MPa, resulting in a green density of about 55% of theoretical density. In parallel, green tiles were also pressed using a chemically co-precipitated powder having 8 mole percent yttria, TZ8Y, available from Tosoh.

The flexible green tape of yttria-stabilized zirconia was cut into bar or disk shapes with a laser machine. The green bars and disks were sintered on zirconia setter plates in a furnace with an increasing temperature at a rate of 100° C. per hour to 1,500° C. and held at 1,500° C. for one hour, followed by a cooling by power shutdown. The sintered density was higher than 98% of theoretical density.

A 4-probe electrical conductivity test was used to determine the electrical conductivity of the sintered yttria-stabilized zirconia samples. Commercially available platinum paste was used to establish electrical contacts. The samples were then baked at 900° C. for high temperature measurements.

Figure 2:
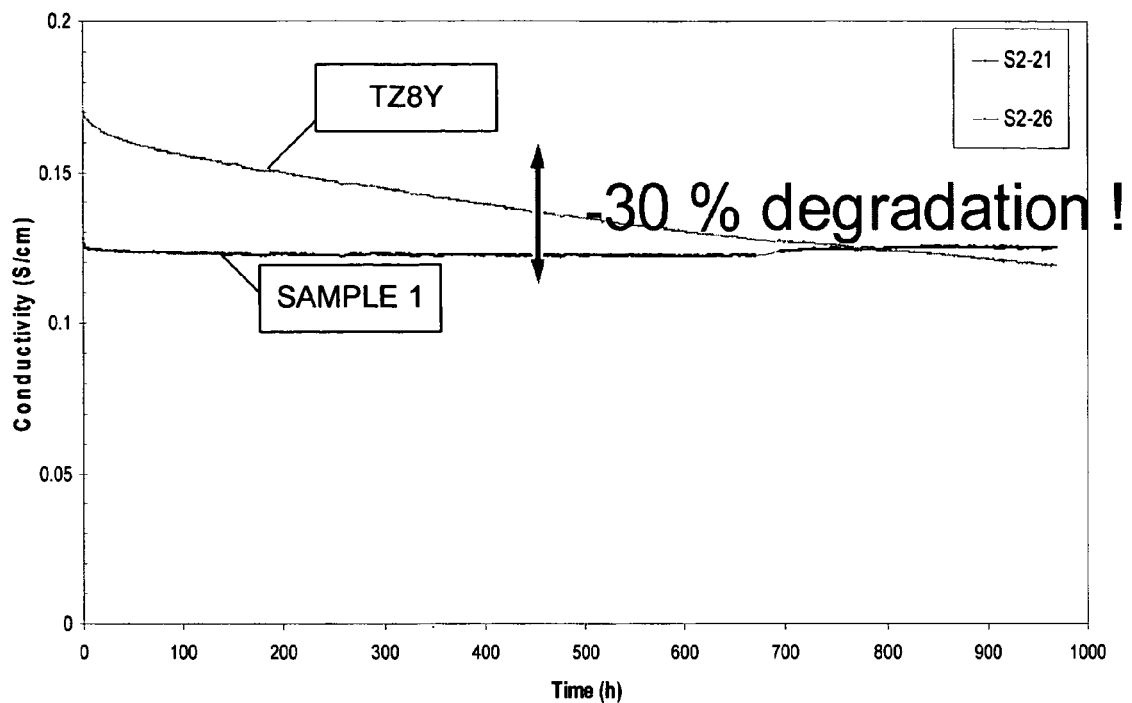
FIGS. 2, 3, and 4 are graphs illustrating degradation in conductivity over time for electrolytes.

The electrolyte from the 10 mole percent yttria-stabilized zirconia fused powder showed a negligible degradation at 1,000° C. for 1,000 hours, compared to a significant degradation of the TZ8Y sample. As shown in FIG. 2 over long term, the 10 mole percent yttria-stabilized fused powder maintains a higher conductivity and lower degradation rate than the TZ8Y sample from chemically co-precipitated powder.

EXAMPLE 2

A 1000 hour test was conducted on exemplary samples of fused 10 mol % yttria-stabilized zirconia (Sample 2) and 10 mol % chemically co-precipitated yttria-stabilized zirconia. The 10 mol % chemically co-precipitated yttria-stabilized zirconia is labeled TZ10Y, the raw material powder from Tosoh company.

A 4-probe electrical conductivity test was used to determine the electrical conductivity of the sintered yttria-stabilized zirconia samples. Electrolyte bar samples of each of the respective samples were subjected to voltage testing every 10 minutes for 1000 hours at 1000° C. using a 1 mA current. Platinum wires (Diameter=0.2 mm) were fixed with Platinum paste (TR7905/Tanaka Kikinzoku Kogyo K. K.) to each bar to form electrodes. The wire and the paste were dried at 100° C. during 5 hours then sintered at 1000° C. during 5 hours (300° C./h).

Figure 3:
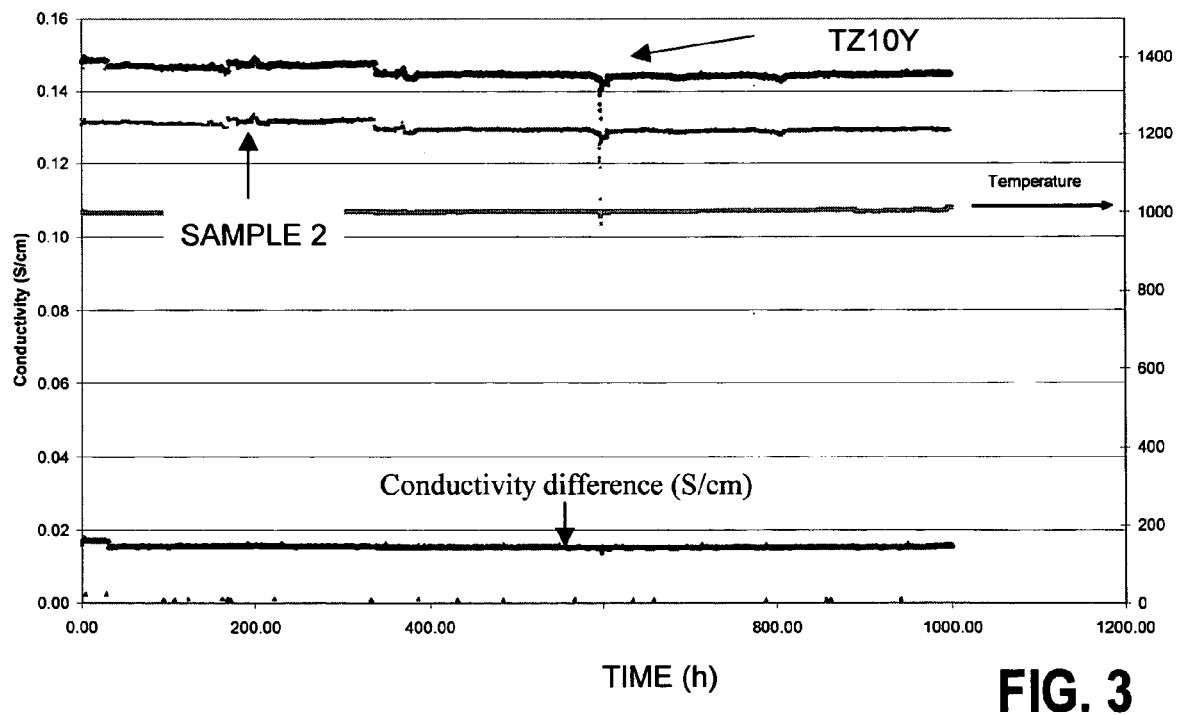

As shown on FIG. 3, the conductivities of both samples are almost constant in time. The TZ10Y average conductivity is around 0.145 S·cm$^{-1}$ and the fused electrolyte sample (Sample 2) shows an average conductivity around 0.130 S·cm$^{-1}$. Thus, the conductivity of TZ10Y sample is 10% higher than the fused Sample 2.

Figure 4:
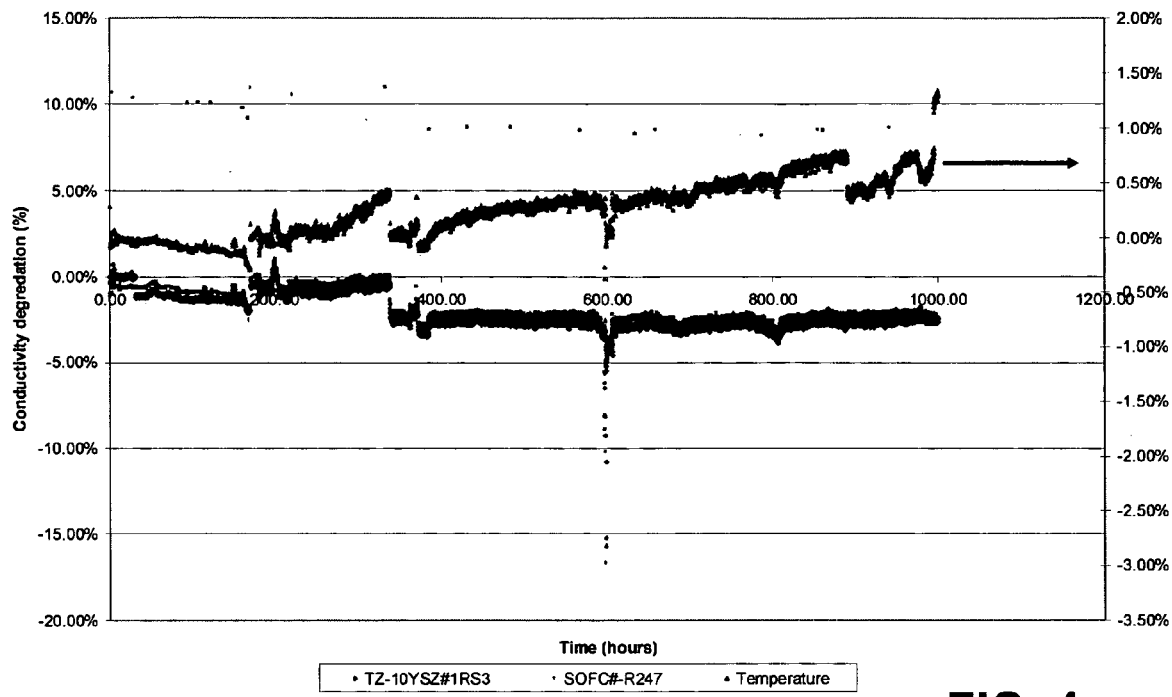

For each sample the conductivity degradation as a function of time has been calculated and is shown in FIG. 4. The results indicate a slight slope break after 340 hours for both samples. The TZ10Y electrolyte and the fused Sample 2 electrolyte show a slight decrease. This degradation was probably caused by a temperature deviation. Prior to the change, the temperature suddenly increased to 1004° C. and likely modified the conductivity of the samples. After the deviation, the temperature returned to 1000° C. Later, the deviation started again and increased continuously to reach 1010° C. at the end of the test. After the slope break, the degradation remained constant. The overall average degradation rates for TZ10Y and Sample 2 are 2.8% and 2.4%, respectively. However, for extended periods, such as beyond 600 hours, the degradation was negligible, such as not greater than about 0.1% per 1000 hours.

While, the fused powder-based samples may exhibit a similar degradation profile to chemically co-precipitated powder-based samples having an equivalent doping of stabilizing agents, Sample 1 shows superior performance and the fused powder is less expensive and therefore more cost effective than chemically co-precipitated powders. In addition, slower average degradation rates for the Sample 2 may lead to better conductivity in SOFCs during longer SOFC use, such as 50,000 hours or more.

Figure 5:
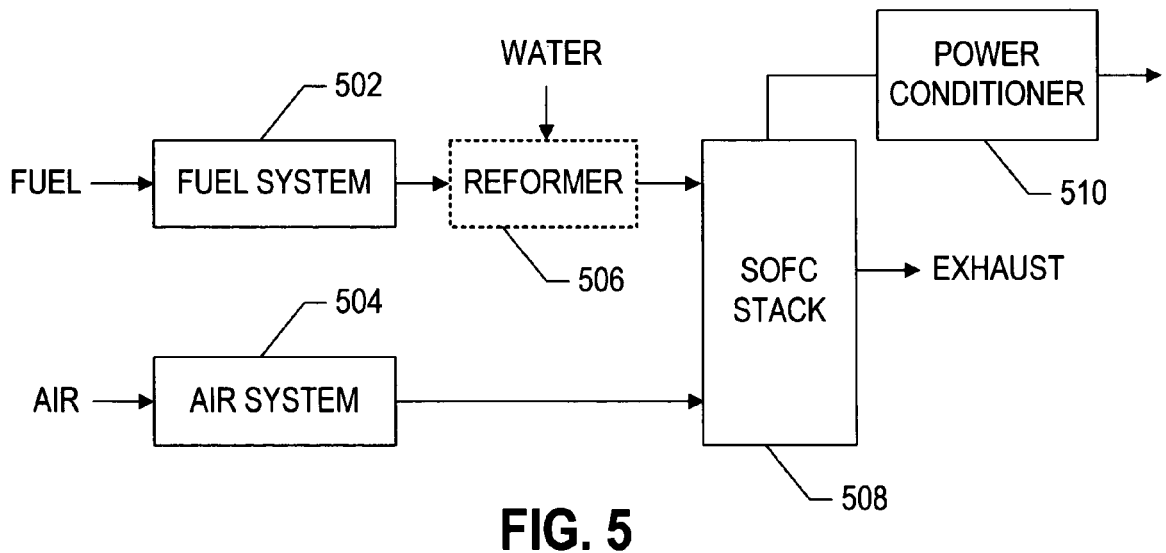
FIG. 5 illustrates an SOFC system.

The solid oxide fuel cells described above may be incorporated into a SOFC system for producing power. FIG. 5 depicts an exemplary SOFC system. The system includes a fuel system 502, an air system 504, a SOFC stack 508, and a power conditioner 510. The system may also include a reformer 506 depending on the expected operating temperature of the SOFC stack.

Fuel enters the fuel system 502. The fuel system 502 may clean the fuel and/or heat the fuel in preparation for reforming or reaction. The fuel system 502 may include heat exchangers, compressors, pumps, absorption beds, and other components. From the fuel system 502, the fuel enters a reformer 506. The reformer 506 may use the fuel to produce hydrogen and other molecules. The reformer 506 is typically used for low temperature SOFC systems. High temperature SOFC systems may have the advantage of internal reforming and thus utilize unreformed fuel.

Air enters the air system 504. The air system 504 may clean, compress, purify, and/or heat the air. The air system may include compressors, absorption beds, membranes, and heat exchangers, among other components.

The fuel and air are directed to the SOFC stack 508. The fuel is typically directed across the anodes of the fuel cells in the SOFC stack and the air is typically directed across the cathodes. In the case of SOFCs, oxygen ion transport across the electrolyte from the cathode to the anode produces an electric potential. This electric potential is conditioned with a power conditioner 510 that is electrically coupled to the SOFC stack 508. The power conditioner 510 may deliver power to a grid or circuitry. Exhaust from the SOFC stack may be used for heat exchange or in the reformation process.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A solid oxide fuel cell, comprising:
   an anode layer;
   an electrolyte layer overlying the anode layer, the electrolyte layer comprising a sintered layer of electrolyte powder, the electrolyte powder being a melt-processed fused stabilized zirconia powder that is sintered to form the electrolyte layer; and
   a cathode layer overlying the electrolyte layer.

2. The solid oxide fuel cell of claim 1, wherein the electrolyte powder further comprises yttria in an amount greater than 8 mole percent.

3. The solid oxide fuel cell of claim 1, wherein the electrolyte layer has a conductivity degradation not greater than about 0.2 percent per 1000 hours.

4. The solid oxide fuel cell of claim 1, wherein the electrolyte layer has a conductivity degradation not greater than about 0.1 percent per 1000 hours.

5. The solid oxide fuel cell of claim 1, wherein sintering of the melt-processed fused powder includes pressureless sintering.

6. The solid oxide fuel cell of claim 5, wherein sintering includes hot pressing.

7. The solid oxide fuel cell of claim 5, wherein sintering includes hot forging.

8. A solid oxide fuel cell stack comprising a plurality of solid oxide fuel cells according to claim 1.

9. The solid oxide fuel cell stack of claim 8, wherein the solid oxide fuel cell stack comprises at least 3 cells.

10. The solid oxide fuel cell stack of claim 8, wherein the solid oxide fuel cell stack comprises at least 4 cells.

11. The solid oxide fuel cell stack of claim 8, wherein the solid oxide fuel cell stack, including the electrolyte layer, is formed by sintering.

12. The solid oxide fuel cell stack of claim 11, wherein sintering is carried out by co-firing the plurality of solid oxide fuel cells.

13. The solid oxide fuel cell stack of claim 12, wherein co-firing is carried out by hot pressing.

14. A solid oxide fuel cell system comprising:
    a fuel system for conditioning fuel;
    an air system for conditioning air;
    a solid oxide fuel cell stack connected to the fuel system and connected to the air system, the solid oxide fuel cell stack having a plurality of solid oxide fuel cells, each solid oxide fuel cell of the plurality of solid oxide fuel cells comprising (i) an anode layer, (ii) an electrolyte layer overlying the anode layer, the electrolyte layer comprising a sintered layer of electrolyte powder, the electrolyte powder being a melt-processed fused stabilized zirconia powder that is sintered to form the electrolyte layer, and (iii) a cathode layer overlying the electrolyte layer; and
    a power conditioner electrically coupled to the solid oxide fuel cell stack.

15. The solid oxide fuel cell system of claim 14, wherein the fuel system is in fluid communication with an anode of the solid oxide fuel cell stack and wherein the air system is in fluid communication with a cathode layer of the solid oxide fuel cell stack.

* * * * *